United States Patent
Løken (10) Patent No.: US 8,700,501 B2
(45) Date of Patent: Apr. 15, 2014

(54) METHOD AND SYSTEM FOR STORAGE AND RETRIEVAL OF TRACK AND TRACE INFORMATION

(75) Inventor: Magnar Løken, Oslo (NO)

(73) Assignee: Kezzler AS, Oslo (NO)

( * ) Notice: Subject to any disclaimer, the term of this patent is extended or adjusted under 35 U.S.C. 154(b) by 0 days.

(21) Appl. No.: 13/376,125

(22) PCT Filed: May 31, 2010

(86) PCT No.: PCT/NO2010/000198
§ 371 (c)(1),
(2), (4) Date: Jan. 18, 2012

(87) PCT Pub. No.: WO2010/140892
PCT Pub. Date: Dec. 9, 2010

(65) Prior Publication Data
US 2012/0130868 A1    May 24, 2012

Related U.S. Application Data

(60) Provisional application No. 61/184,745, filed on Jun. 5, 2009.

(30) Foreign Application Priority Data

Jun. 8, 2009  (GB) .................................. 0909803.9

(51) Int. Cl.
*G06Q 40/00* (2012.01)

(52) U.S. Cl.
USPC ........................................................ 705/28

(58) Field of Classification Search
None
See application file for complete search history.

(56) References Cited

U.S. PATENT DOCUMENTS

| | | | |
|---|---|---|---|
| 6,442,276 B1 | 8/2002 | Doljack | |
| 6,775,422 B1 | 8/2004 | Altman | |
| 2003/0119923 A1 | 6/2003 | Bohnen et al. | |
| 2005/0261935 A1* | 11/2005 | Silverbrook et al. | 705/2 |
| 2006/0100964 A1 | 5/2006 | Wilde et al. | |
| 2008/0011841 A1* | 1/2008 | Self et al. | 235/385 |

FOREIGN PATENT DOCUMENTS

| | | |
|---|---|---|
| EP | 1719070 B1 | 4/2009 |
| WO | WO 00/23954 A1 | 4/2000 |
| WO | WO 02/073551 A1 | 9/2002 |
| WO | WO 2006/092544 A1 | 9/2006 |

OTHER PUBLICATIONS

Kezzler, "Drugs with an idenity. . . the key to a secure drug supply chain",Kezzler 2006, (24 pages).
M. LØKEN, "Impact", Kezzler, Mar. 13, 2007, (29 page).

* cited by examiner

*Primary Examiner* — Shay S Glass
(74) *Attorney, Agent, or Firm* — Birch, Stewart, Kolasch & Birch, LLP (57) ABSTRACT

A system and method for tracking and tracing items that in one aspect comprises generating a group of unique codes, where a unique code is a unique encrypted reference, transferring the group of unique codes to an item marking location, marking items with the unique codes. Further, for tracking the items, decrypting the unique codes of a marked item to obtain the unique reference, and creating and storing the tracking records in a unique storage location, where the unique reference refers to the unique storage location. A tree structure resembling the packaging hierarchy is disclosed, where the nodes are referenced by the unique reference, and tracing of entire sub-trees may be performed by entering a unique code. Storage locations and sub-trees may be assigned to tracking cells in a distributed system architecture.

19 Claims, 2 Drawing Sheets

METHOD AND SYSTEM FOR STORAGE AND RETRIEVAL OF TRACK AND TRACE INFORMATION

CROSS REFERENCE TO RELATED APPLICATIONS

This application is the National Phase of PCT/NO2010/000198 filed on May 31, 2010, which claims the benefit under 35 U.S.C. 119(e) of U.S. Provisional Application No. 61/184,745 filed on Jun. 5, 2009, and claims priority under 35 U.S.C. 119 (a) to Patent Application No. 0909803.9 filed in United Kingdom on Jun. 8, 2009, all of which are hereby expressly incorporated by reference into the present application.

TECHNICAL FIELD

The invention relates to the storage and retrieval of track and trace information. More specifically it relates to a system and method for managing track and trace information, comprising generation and distribution of codes to be marked on the tracked items, adding tracking records during the lifetime of the tracked items, tracing the items and validating the items based on the unique code marked on the item.

BACKGROUND ART

Secure track and trace is a well known concept for securing a supply chain, from the manufacturer to the consumer, against counterfeiting and other fraudulent activities. Counterfeiting affects both the manufacturer and the public. E.g. in the field of pharmaceuticals, fake medicines may have no effect, or they can have dangerous side effects.

Due to lack of knowledge and control from proper authorities, corrupt and vicious business operators may gain access to supply chains, flooding them with dangerous products. Due to the prospects of high profit in the area of counterfeiting and the resources invested into the counterfeiting business by the swindlers, it can be hard to differentiate or detect counterfeited products and businesses dealing with unsafe products from legal products and businesses.

The modus operandi of a secure track and trace system according to background art is to actively include and protect the parties operating legally in the supply chain and exclude all others.

A secure track and trace system is surveying and managing all goods having been marked and registered with a unique identifier, and at the same time controlling all parties allowed to handle the products, all the way from the manufacture to the end consumer.

Predominately a secure track and trace system controls and assigns responsibly of the handling of the market and registered goods to a possessor.

By default unmarked products are unsafe and will not be allowed to enter the supply chain, and further any unregistered party is unable to be responsible for any marked goods.

Track and trace systems according to background art works in the way that product items and associated transportation units are marked with a unique identifier. This identifier is then utilized to authenticate the product in the supply chain. If the authentication process has a positive outcome, i.e. the product and code has been determined to be genuine, additional information related to the product and the present stage of the supply chain may be recorded and stored for later retrieval and analysis. The pivotal information that is recorded during the addition of a new tracking record is the identity of the product or transportation unit, the location and the time and also information about the operator. If available, the devices and method by which the product was authenticated. as well as other circumstantial information may also be recorded in the tracking record.

This series of tracking records recorded by the track and trace system will result in a complete history of the handling of the product in the supply chain, that might be presented at any time for security or other purposes.

Secure track and trace can be seen as a practical embodiment of the following 4W pillars; At all times it must be known (a) which products are located (b) where, (c) when they got there and conveyed/received by (d) whom, all considered in that order of significance The logical and practical consequence of this postulate is that accountability for the parties being part of the supply chain can be controlled and also transferred in a controlled manner. Tracking is the process and result of a series of authentications respecting the 4W postulate.

The enforcement of this postulate has two main impacts; a) it prevents counterfeited goods to enter the secured supply chain and b) it detects "leakage" and "doctoring" of genuine products for illegal handling and intentions. Diversion, illegitimate handling and dealing with genuine products is easily detected.

The management of tracking information by the use of a unique code, often referred to as the product identification code (PID), has traditionally been managed by the use of a database system, such as Relational Database Management System (RDBMS). For some manufacturing plants the number of products produced and the corresponding number of unique codes become extremely large, e.g. in the order of $10^{12}$. One of the problems with databases is that for very large numbers of unique codes the performance needed to provide an acceptable level of system response time has found to be to unpredictable as well as inadequate. In fact conventional database technologies have not been designed for this type of application. The most prominent shortcoming of the database is the generation of unique codes, often in relation or as a feed from a pseudo random number generator, whereby the database (system) for every single new PID proposed, must reference or search amongst the already existing PID's to control and determine that the the proposed PID has not been issued before in order to preserve and guarantee code uniqueness amongst the complete code population. In most database systems this concept is known as a primary key check. Partitioning of databases is possible, but does not solve the problem of having to manage an index for large amounts of data.

European patent EP1719070B1 (Sagar et al) describes a system where manufactured goods are marked or labelled with a secure unique identifier being a unique product identifier code digitally signed by means of a secret derived from a plurality of secret codes. A central checking centre allows users to verify the authenticity of a particular good such as a cigarette pack or carton via any convenient interface such as the Internet or a cell phone. Sharing of a secret code allows authentication of each item.

U.S. Pat. No. 6,442,276 B1 discloses a method and system for verifying the authenticity of goods that includes generating one or more random codes and storing the one or more random codes in a database. The goods are then marked with one of the generated random codes such that each of the goods contain their own unique random code. Upon field checking and inventory of marked goods and comparing the codes on the marked goods to codes within the database, the authenticity of goods may be verified.

International patent application WO0023954A1 discloses a method of verifying the authenticity of goods, wherein a set of public data (4, 6, 8) and security code (10) are applied to the goods (2), the security code having been derived from the public data by means of a predetermined encryption algorithm. Upon receiving a request for verification, the public data (4, 6, 8) applied to the goods (2) is entered into the predetermined encryption algorithm to generate a verification code. The verification code is then compared with the security code (10) applied to the goods to assess the authenticity of goods.

International application WO2006/092544 describes a method for marking packed articles in a packaging hierarchy.

US patent application US2006/0100964 A1 describes how to provide a product with a product specific identification sequence, which is coded into a check sequence using a secret encoding sequence. The product can be authenticated by decoding the check sequence.

U.S. Pat. No. 6,442,276 B1 discloses a method of verifying the authenticity of goods including generating one or more random codes and storing the codes in a database.

U.S. Pat. No. 6,775,422 B1 discloses a storage system for paper and electronic documents. The records of a database uniquely identifies the physical locations of the paper and electronic documents.

International patent application WO 02/073551 A1 describes a system for tracking articles with an article number and verifying the authenticity of the articles. Articles are packed into containers and a database is provided for storing the article numbers and the corresponding container number.

SHORT SUMMARY OF THE INVENTION

The present invention provides a method and a system for tracking and tracing items in a new system architecture that overcomes the problems related to track and trace systems according to background art, as described above.

In one aspect the invention is a computer implemented system and method for tracking and tracing items, comprising;
- generating a group of unique codes with a code generator, where each of the unique codes comprises a unique reference encrypted with a unique key,
- transferring the group of unique codes to an item marking location, e.g. in a manufacturing plant,
- marking each of one or more of the items with at least one of the unique codes.
- decrypting one or more of the unique codes with the unique key in a code decrypter to obtain the unique references,
- creating one or more tracking records for one or more of the items marked with the unique codes, and storing the tracking records in one or more unique storage locations in said system, wherein one or more of the unique references are references to one or more of the unique storage locations.

In an embodiment of the invention a relation node for each of one or more of the items is created wherein the relation nodes are arranged in a tree structure, and relationships between the relation nodes represent packaging relationships between the items, wherein one or more of the relation nodes are arranged for referring to a unique storage location for the item represented by the relation node. In an embodiment the unique references are unique references to the relation nodes.

In an embodiment of the invention a trace of an item marked with the unique codes is performed by decrypting the unique codes with the unique key to obtain the unique references and retrieving one or more of the tracking records corresponding to the marked items from the storage locations referred to by the unique references.

To trace a packaging hierarchy, where items are in a packaging relationship to a traced item, the neighbouring relation nodes of the relation node are found in the relation tree, and tracking records retrieved from the unique storage location referred to by the neighbouring relation nodes.

In an embodiment the track and trace system is implemented in a flexible, distributed system architecture made possible by the invention, comprising one or more computer implemented tracking cells, each arranged for managing a subset of the unique storage locations and a subset of the relation nodes. The tracking cells may be controlled by tracking cell controllers, where the tracking cell controllers are arranged for assigning the responsibility to tracking cells for managing a subset of the unique storage locations and relation nodes.

An advantage of the present invention is that the unique codes used for marking the items are not required to be stored by the track and trace system, thus there is no explicit relation between the unique codes and the tracking information. This adds an additional layer of security, and reduces the complexity of the track and trace system.

Accordingly, there is no need for a database system to store the unique codes or performing a primary key check, i.e., there is no need to manage a database index, whereby the bottleneck in the system according to background art is eliminated and a new, flexible system architecture taking into account the specific needs of track and trace applications can be deployed. For large scale systems the increase in system performance may be considerable.

An advantage of the present invention is that a complete set of tracking records for a package hierarchy, such as a pallet of boxes, where each box contains a number of packages etc., can be obtained in one single trace. Another advantage is that tracking records do not have to be explicitly created in a tracking operation for marked items contained in another marked item.

Yet another advantage of the present invention is that the unique codes used for marking the items are not based on any information related to the product. This allows generation of unique codes even before the items are actually produced.

According to the invention a new, scalable and distributed system architecture is disclosed. The track and trace system according to the invention can therefore grow with the organisation and business by adding new devices and assigning responsibility to them. This kind of distributed system also provides the advantage of improved reliability.

BRIEF DESCRIPTION OF THE DRAWINGS

The invention is illustrated in the attached drawing figures meant to illustrate preferred and alternate embodiments of the invention. The drawings shall not be construed to limit the scope of the invention which shall solely be limited by the attached claims.

DETAILED DESCRIPTION

The invention will in the following be described with reference to the attached figures a number of aspects and embodiments according to the invention will be described. It should be noted that the invention should not be limited to the embodiments described in this disclosure, and that any embodiments lying within the spirit of this invention should also be considered part of the disclosure.

Figure 1:
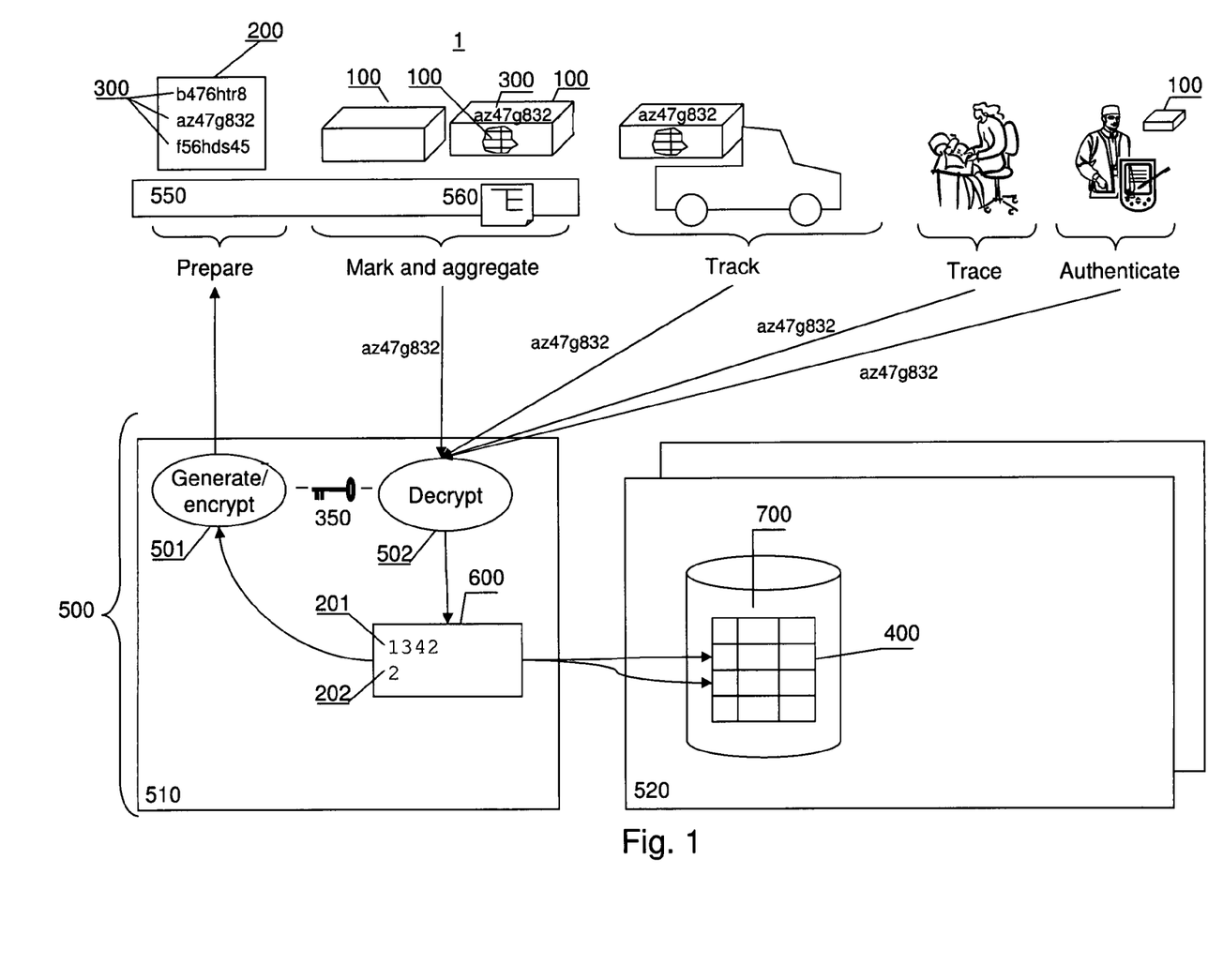
FIG. 1 illustrates in a block diagram a track and trace system according to the invention. It also illustrates the main use cases involving the track and trace system.

Referring firstly to FIG. 1 of the drawings illustrating an embodiment of the present invention, where the upper part depicts typical use-cases in typical track and trace scenarios, whereas the lower part depicts an example of a system architecture used for implementing a track and trace system according to the invention.

The following use-cases which in the following will be described in more detail are; preparation for the track and trace process, marking of items and aggregation of packaging relationships, tracking items, tracing items and authenticating of items. In addition, related information handled by the system will be described in relation to the use-cases.

In the preparation for the tracking and tracing of information in the prepare use case in FIG. 1, a batch, or a group (200) of unique codes (300) are generated and encrypted with a unique key (350) according to the invention. The number of unique codes (300) generated in a group (200) may depend on the number of items to be manufactured or packaged, but the number of generated unique codes is not critical since there is no relationship between the generated unique codes and the items (100) before they are marked on items and corresponding information has been recorded in the packaging management system or the track and trace system (500). The preparation may be done before the manufacturing process has started or even before the production line has been set up. A packaging management system (550), comprising a software system working in concert with an integrated or otherwise in connection with peripheral production machinery and other equipment such as printers and various type of scanners is provided with the group of unique codes from the track and trace system. The transportation method of the unique codes (300) in not central to the present invention and can be carried out using known techniques such as secure file transfer over the Internet, or the unique codes might be transferred using any other suitable digital media.

The packaging management system (550) then carries out the process of marking the relevant unique codes onto the products. As a part of this process the packaging management system (550) will aggregate, establish and record all the unique codes (300) and also the association between all employed unique codes (300), i.e., association between a marked box and the marked packages it contains. The associations may be represented in a packaging hierarchy. This invention is not concerned with the actual methods and process of the aggregation as this might be performed in a multiple of ways serving the given circumstances.

In an embodiment of the invention the unique codes (300) are listed in a digital file (560), where its relationship with other unique codes (300) is uniquely indicated. It is important to observe that the unique codes (300) in this file are in clear text and is in fact the encrypted code by which the product or item (100) was marked as explained earlier.

Associated with every single unique code in this file (560) there may be a flag or status denomination, or other type of indication or relevant aspects concerning that individual unique code. These flags may indicate that the item (100) has been inspected, quarantined, reworked, and rejected, etc.

Further, every unique code may have one or several time stamp(s) associates to when it was marked, printed, scanned, etc or when a certain flag was linked to the item (100).

It is not a requirement that the unique codes (300) are collected and aggregated in a sequence that is the same as the sequence by which the unique codes (300) were originally delivered to the production system in the original transfer.

The file (560) may also contain group (200) information, common for all the unique codes (300), with product specific information such as batch number, line ID, Factory ID, expiry dates, product name, etc.

The resulting hierarchical packaging file (560) may then a safe way uploaded to the central track and trace system (500) in preparation for the initiation of the tracking process.

In an embodiment the packaging management system (550) is communicating in real-time or near real-time with the track and trace system (500), tracking records (400) may be created before, during or after marking of an individual item (100), or before, during or after marking of related items (100), such as a box containing packages. Standard or proprietary protocols may be used for the transfer of information as will be understood by a person skilled in the art.

In the mark and aggregate use-case illustrated in FIG. 1, occurring preferably during a manufacturing or packaging process, the items (100) are marked with a unique code (300) from the group (200) of codes that was initially transferred to the packaging management system (550). All items (100) relevant for tracking and tracing should be marked with a unique code (200). However there is no requirement in the present invention to mark all manufactured items. E.g. it would be possible to mark only every tenth produced item if it is found that this provides a sufficient level of security. Neither is it a requirement to mark the items (100) in any specific sequence of unique codes (300). In principle, any generated unique code (300) can be used to mark an item (100) according to the present invention.

In an embodiment of the invention, that may be implemented when the marked items do not have any relationship with other marked items, or it has been decided that the relationship should not be recorded, aggregation is not needed, and tracking records (400) may be created in real-time or based on the packaging file (560) described above. Thus, when an item (100) is marked, a tracking record (400) may be created in the system (500) by decrypting the unique code (300) marked on the item (100) to get access to a unique reference (600) arranged for pointing to a storage location for one or more tracking records (400) for the item (100). A tracking record (400) is created in this storage location (700), comprising information specific for the item (100) and the production or packaging of the item (100), e.g., time, id, product number etc.

A tracking record (400) may be a row in a database table or information in a file. It could also be serialised information in an item object representing the marked item (100). The actual implementation of the tracking record (400) is not important for the invention and may be implemented as understood by a person skilled in the art.

Figure 2:
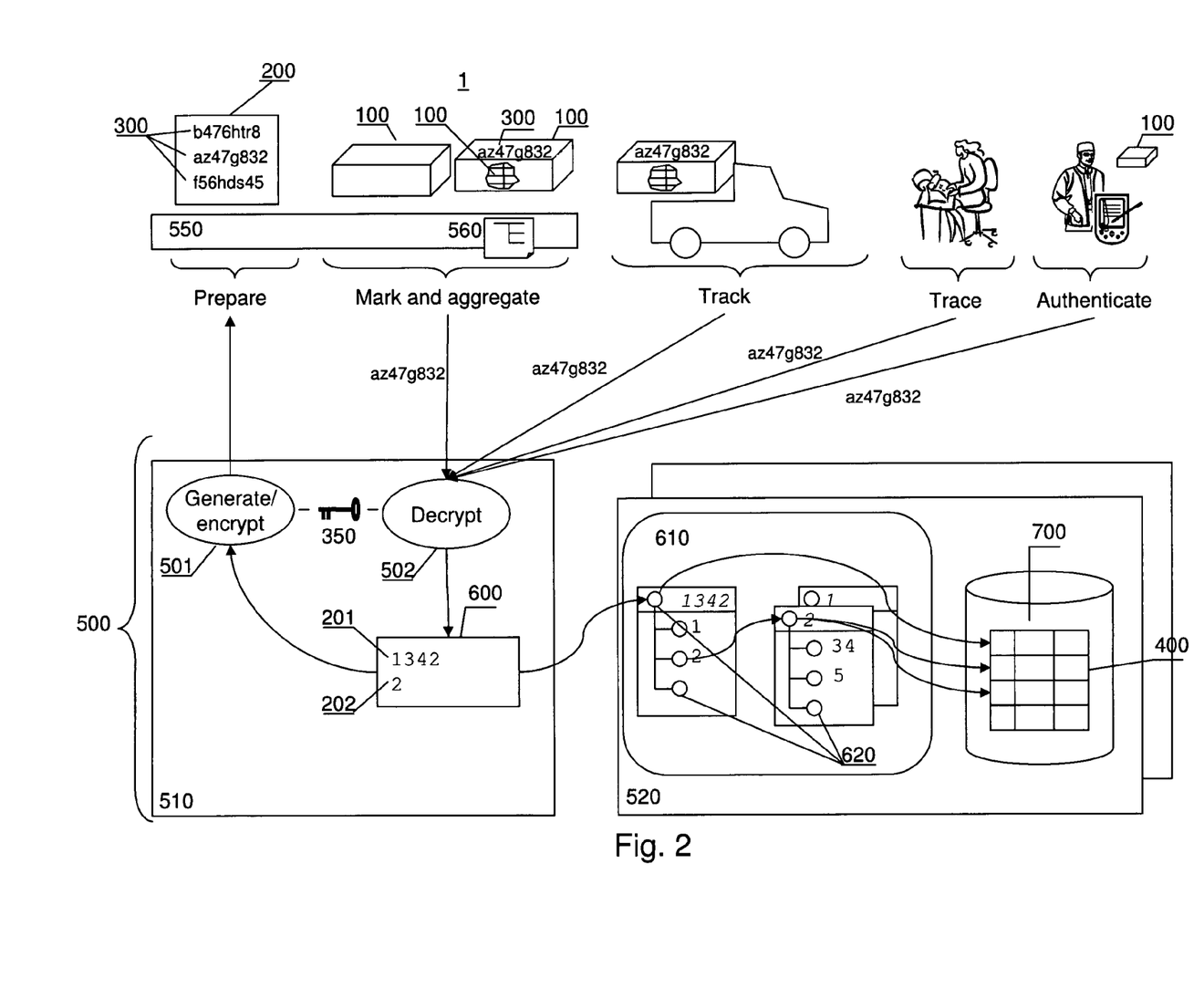
FIG. 2 illustrates in a similar manner to FIG. 1 a block diagram for a track and trace system according to the invention, and in addition comprising a reference tree for management of packaging hierarchies.

In an embodiment of the invention where the marked items (100) have a packaging relationship, a packaging tree may be created in the track and trace system (500) based on the packaging file (560), or realtime packaging information as described above. The packaging tree is made up of relation nodes (620) representing the items (100). This is shown in FIG. 2.

In order to create the relation nodes (620) the unique codes (300) in the packaging file (560) or in the realtime transfer must be decrypted by a decrypter (502) with the same unique key (350) as was used for the generation of the unique codes (300) initially. The result of the decryption process will be the set of corresponding unique references (600). The track and trace system (500) may control the unique references (600) to determine whether they all are genuine and correctly issued previously by the code generator (501). If the unique references (600) are valid, relation nodes (620) are created, wherein the relationship between the items (100) in the packaging hierarchy is indicated by their internal relations in the packaging tree in the track and trace system (500). One or more tracking records (400) are then created in a unique storage location (700), where the relation node (620) provides a reference to the unique storage location (700). The reference may be explicit or implicit, where implicit means that a part of the reference to the unique storage location (600) is held by a parent relation node (620).

According to an embodiment of the invention the relation nodes (620) comprises one or more flags (621) arranged for representing states of the items (100) represented by the relation nodes (620). In an embodiment a flag (621) is arranged to indicate that tracking records (400) cannot be created for an item (100) with a unique reference (600). In an embodiment the flags (621) are arranged to indicate that an item (100) is deemed to be withdrawn.

In the track use case additional information regarding the shipping and handling in the supply chain of the marked items (100) are added as tracking records (400) to the system. In a similar manner to the mark and aggregate use case a tracking record (400) may be created in the system by decrypting the unique code (300) marked on the item (100) to get access to a unique reference (600) arranged for pointing to a storage location (700) for one or more tracking records (400) for the item (100). The tracking record (400) is created in this storage location, comprising information specific for the item (100) in the specific, e.g., acceptance time, operator, etc. New tracking records (400) may be added any number of times, depending on the needs and complexity of the supply chain. If a unique reference (600) is not available after the decryption process or the unique reference (600) is not recognised by the system, the code on the marked item has not been generated by the corresponding encryption process during the preparation use-case, and one could e.g. suspect that someone are trying to introduce other products into the supply chain.

In an embodiment the invention is a method for tracking and tracing items (100) comprising the steps of;
  generating a group (200) of unique codes (300) in a computer implemented track and trace system (500), where each of the unique codes (300) comprises a unique reference (600) encrypted with a unique key (350),
  transferring the group (200) of unique codes (300) to an item marking location (1),
  marking each of one or more of the items (100) with at least one of the unique codes (300),
  decrypting one or more of the unique codes (300) in the computer implemented track and trace system (500) with the unique key (350) to obtain the unique references (600),
  creating one or more tracking records (400) for one or more of the items (100) marked with the unique codes (300), and storing the tracking records (400) in one or more unique storage locations (700) in the computer implemented track and trace system (500),
wherein one or more of the unique references (600) are references to one or more of the unique storage locations (700).

In an embodiment the invention is a computer implemented track and trace system (500) for tracking and tracing items (100) comprising;
  a code generator (501) arranged for generating a group (200) of unique codes (300) where each of the unique codes (300) comprises a unique reference (600) encrypted with a unique key (350),
  a code decrypter (502) arranged for decrypting the unique codes (300) with the unique key (350) to obtain the unique references (600),
the computer implemented track and trace system (500) arranged for creating one or more tracking records (400) for one or more of the items (100) marked with the unique codes (300), and storing the tracking records (400) in one or more storage locations (700) in the computer implemented track and trace system (500),
wherein one or more of the unique references (600) are references to one or more of the unique storage locations (700).

According to the present invention the cleartext unique codes (300) marked on the item or product effectively can be represented by the unique reference (600) that may be stored in the track and trace system (500). This means that the association or mapping of the stored unique references (600) with the correct unique codes (300) is impossible if the encryption method used is a one way function, such as a message digest algorithm, also known as hashing. This means that the protection of the stored data is enhanced significantly as there is no way of making sense of them without the assistance of the encryption process. Further this enables an embodiment of the invention where two processes can be separated and commutate in a safe way that makes both systems unavailable to any one single party. The encryption method used can be any encryption standard, such as e.g. DES, triple-DES, AES or any other suitable encryption algorithm providing the required encryption strength. It may also be combinations of obfuscation and hashing combined with encryption to make brute force attacks unfeasible, as it would be even more difficult to determine the correct unique reference.

A marked package can contain smaller packages or items. Each time a smaller package is included in a larger package we may say that a new level is added to the package hierarchy, where packages that have the same number of preceding parent packages defines a packaging level. For instance, a box with the unique code 56HJQWEDRF5TGH1, (parent code) contains twenty single packs among which the unique code S4R5T125KJHGTTRD (child code) was one of the single packs.

A tracking hierarchy, or tree structure reflecting the package hierarchy can be constructed in the track and trace system to track and trace the items more efficiently.

In FIGS. 1 and 2 the term "aggregate" in the mark and aggregate use case relates to the construction of a tracking hierarchy corresponding to the relationships between marked items (100). In an embodiment of the invention the relation nodes (620) are arranged in a tree structure, and relationships between the relation nodes (620) represent packaging relationships between the items (100). Thus, a relation node (620) relates one-to-one to the tracked physical item (100).

A tracking hierarchy is a structure where all the unique references (600), has a relations to the other unique references (600). This makes a "family tree" or "pedigree" for all the unique references (600). The following definition may be applied for the tracking hierarchy of relation nodes (620) comprising unique references (600):
  A parent relation node (620) may have any number of child relation nodes (620).
  A parent relation node (620) may be a child relation node (620) of a preceding parent relation node (620)
  There is only one superparent (don), a superparent has no parent relation node (620), it is no child code.
  Relation nodes (620) that have the same number of preceding parent relation node (620) defines a level.

In a tracking hierarchy all the relations between the relation nodes (620) are known to the tracking system. Therefore when a parent relation node (620) is tracked, by default all its child relation nodes (620) may be "tracked" also. When a new tracking record for a parent relation nodes (620) is made, this data is not (explicitly) recorded for the child relation nodes (620). However it may inherit and use the data associated by inheriting it from the parent relation nodes (620).

In an embodiment of the invention the tracking records (400) pointed to by one or more neighbouring relation nodes (620) of a relation node (620) referenced by a unique reference (600) are retrieved in the same request.

This methodology for tracking and tracing have at least three advantages:

Very practical to track the outer packaging parent relation node (620) only (as opposed to track all items all the time)

Gives an intuitive and excellent overview of the product flow of the supply chain Less disk storage and better retrieval times An advantage of the present invention is that the items are marked with unique encrypted codes, whereas the unique codes are unencrypted in the track and trace system. This requires less storage space and better retrieval performance than what is offered by track and trace systems according to background art.

A further advantage related to security is that there is no explicit relation between the unique encrypted codes marked on the item and the tracking information.

In an embodiment of the invention a relation node (620) for each of one or more of the items (100) are created, wherein the relation nodes (620) are arranged in a tree structure, and relationships between the relation nodes (620) represent packaging relationships between the items (100), wherein one or more of the relation nodes (620) are arranged for referring to a unique storage location (700) for the item (100) represented by the relation node (620). 3. In an embodiment the unique references (600) are unique references to the relation nodes (620).

To trace an item as is depicted in the trace use case in FIG. 1, it is necessary to retrieve information from one or more of the tracking records (400) of the marked item (100) subject to the trace. To access the information the unique code (300) marked on the item (100) is entered in the track and trace system according to the invention, whereby the unique code is decrypted with the unique key (350), and the resulting unique reference (600) points to the storage location of the tracking records (400) of the tracked item (100).

In an embodiment of the invention one or more of the items (100) marked with the unique codes (300) are traced, by decrypting the unique codes (300) with the unique key (350) to obtain the unique references (600) and retrieving one or more of the tracking records (400) corresponding to the marked items (100) from the storage locations (700) referred to by the unique references (600).

In an embodiment of the invention tracking records (400) for items (100) in a packaging relationship to the traced items (100) are retrieved by looking up one or more neighbouring relation nodes (620) of the relation node (620) corresponding to the traced item (100), and retrieving tracking records (400) from the unique storage location (700) referred to by the neighbouring relation nodes (620).

The authenticate use case in FIG. 1 is from a technical point of view similar to the trace use case. However, in the trace use case a known unique number is used for tracing an item, whereas in the authenticate use case, the marked item is usually available, and the user wants to authenticate the item.

In this case the user reads the number on the item (100) and enters the number in the track and trace system, whereby the unique code is decrypted with the unique key (350). If a unique reference (600) is available after the decryption process and the unique reference is recognised by the system, the authentication succeeded and the item marked with the code is valid.

To enable structuring of the information related to the manufacturing or packing process and the marked items, the unique reference may be made up of more than one sub-reference. In an embodiment the unique reference (600) comprises a first level reference (201) and a second level reference (202) wherein the second level reference (202) is unique within the first level reference (201). In this embodiment the first level reference (201) may represent the group (200) in the form of a unique group identifier, and the second level reference (202 may represent a sequence number within the group. The multi-level reference allows information to be structured. Specific parameters common to all items (100) within a group (200) can be stored in a common group record being referenced by the first level reference (201).

In an embodiment of the invention the unique reference (600) comprises a first level reference (201) and a second level reference (202) wherein the second level reference (202) is unique within the first level reference (201).

In an embodiment of the invention the first level reference (201) corresponds to the group (200) and the second level reference (202) corresponds to a sequence number within the group (200).

In an embodiment of the invention one or more of the relation nodes (620) represents the group (200) and contains information that is common to all items (100) marked with a unique code (300) of the group (200).

According to an embodiment of the invention one or more of the relation nodes (620) are stored in flat files.

The packaging tree may in an embodiment be implemented in a file structure called a compass (610) as indicated in FIG. 2. The compass (610) file structure may be implemented as one or more files. The compass (610) file arranged for comprising relation nodes (620) may in this embodiment be implemented as three physical files. One header file for holding information about the number of nodes, field sizes etc, another file for keeping meta-information about the nodes as well as pointers to related nodes like parent node and child nodes, and a third file working as an index for fast child lookups. The file format is based on two very important factors, which is that one can quickly fetch the group reference (201) and the sequence number (202) within that group (200).

The header file may hold information about field sizes used in the next two files. It may also hold information about group (200) aliases. The aliasing is done to save disk space by avoiding using the full group id, but instead using a single byte as an alias. The file may be in XML format, but since it is storing simple metadata values, other formats can also be used.

The reference file may be a fixed binary fixed entry-width file. The field sizes and thus the entry length is adaptable depending on how many nodes needs to be stored in the tree file. The group (200) is used to find the correct file for the tree-structure, and then the sequence number (202) of the unique reference (600) may be directly linked to a position in the file.

In the reference file, each relation node (600) may comprise the following:

Parent unique reference (600)

Child collection offset (The offset of the child collection, file 3)

Child collection count (The amount of child entries in file 3)

Metadata information

The child collection file works as a reverse index, allowing one to fetch all children of a node in a single read. In an embodiment it comprises:

Order id alias

Code index

According to the invention a track and trace system is also disclosed. The track and trace system will now be described with reference to FIG. 1.

In an embodiment of the invention the track and trace system (500) for tracking and tracing items (100) comprises;

a code generator (501) arranged for generating a group (200) of unique codes (300) where each of the unique codes (300) comprises a unique reference (600) encrypted with a unique key (350), a code decrypter (502) arranged for decrypting the unique codes (300) with the unique key (350) to obtain the unique references (600), the track and trace system (500) arranged for creating one or more tracking records (400) for one or more of the items (100) marked with the unique codes (300), and storing the tracking records (400) in the storage locations (700), wherein one or more of the unique references (600) are references to one or more of the unique storage locations (700).

According to the invention it is possible to manage unique codes and hierarchical packaging without the use of a database or conventional retrieval system.

It will in the following be described how the tracking information will be stored and retrieved according to present invention.

Tracking information is most significantly concerned with the recording and storing of what, where, who and when. Other information can also be stored as determined important for the user, however in relation to the present invention this is a choice that should made to suit the relevant business circumstances as understood by a person skilled in the art.

The concepts of a tracking cell and a tracking cell controller will now be introduced with reference to FIG. 1 and FIG. 2.

A tracking cell (520) is a sub-system of the overall track and trace system (500) that is arranged for storing and retrieving tracking information, in essence consisting of a computer system and a suitable database system or the type of storage and retrieval system. The tracking cell (520) may store and manage an amount of groups (200) that may correspond to orders in a manufacturing plant, that has a given population of unique codes (300) that may be adjusted to underlying system of the tracking cell (520), so that a given acceptable performance is ensured by the given tracking cell (520) based on the known performance parameters of the given system. The tracking cell (520) can in such a way serve a given number of groups (200) and unique codes (300) belonging to those groups (200). The design, as well as the individual software and hardware components by which the design is realized, of the tracking cell (520) is not essential to the present invention. It is however evident that since the tracking cell (520) can be completely independent of all the other of tracking cell (520), its design can be quite uncomplicated as opposed to monolithic systems handling a large amount of data.

In an embodiment of the present invention a tracking cell (520) is storing the unique references (600) by building and managing a first index using the group (200) and a secondary index using the serial number of the unique code (300) within the group (200).

According to an embodiment of the invention the tracking system (500) comprises one or more computer implemented tracking cells (520), each arranged for managing a subset of the unique storage locations (700).

In the same way, a tracking cell (520) may also be arranged for managing a subset of the relation nodes (620). The subset of relation nodes (620) managed by a specific tracking cell (510) will typically be one or more packaging sub-trees, where the relation nodes (620) are related.

The tracking cells (520) are communicating both ways (in either direction) with one or more computer implemented tracking cell controllers (510) via know computer and networking techniques and so-called API's and similar techniques.

The tracking cell controllers (510) keep a managed repository that identifies and manages the communication link with each of the tracking cells (520) that are part of the overall tracking and tracing system (500).

Another function of the tracking cell controller (510) may be to build, update and manage a second key repository, which also can be in the form of a database of some type or similar to suit the needs. The tracking cell controller stores which groups (200) are stored in specific tracking cells (520) managed by the tracking cell controller (510). In an embodiment a tracking cell controller (200) may allow a group (200) to be shared among several tracking cells (520), and thus keep track of which part of the group (200) that is handled by each specific tracking cell (520) involved.

In an embodiment the track and trace system (500) comprises one or more tracking cell controllers (510), each arranged for controlling one or more of the tracking cells (520).

According to an embodiment of the present invention one or more of the tracking cell controllers (510) are arranged for assigning the responsibility to tracking cells (520) for managing a subset of the unique storage locations (700) for one or more of the groups (200).

The tracking cell controller (510) is further storing other system information to manage the overall system to meet specific operational parameters such as performance and system data about the software and hardware on the individual tracking cells (520).

The tracking cell controller (510) can based on the monitored data assist the administrator or trigger a predefined process to obtain certain operational adjustments. For instance the tracking cell controller (510) will alert when one or all the tracking cells (520) employed does not any longer meet the performance criteria that has been predetermined by an administrator. Such criteria can be, but not limited to, response time or full usage of disk storage. The tracking cell controller (510) can then automatically build a new tracking cell (520) to accommodate the required addition of performance as a consequence of more data managed and stored by the overall track and trace system (500).

The tracking cell controller (510) may also be able to detect situations were a tracking cell (520) is not available (downtime) and build or restore the tracking cell (520) onto another hardware and software system based on and in communication with a backup system. This might be accomplished by hereto known techniques. Likewise if the tracking cell controller (510) detects that a given tracking cell (520) is not able to meet the performance that is required because of a too large number of users, it can as described above deploy and manage a "clone" of a given tracking cell (520).

In an embodiment of the invention a cell controller (510) is arranged for performing backup of one or more of the tracking cells (520) under the control of the cell controller (510) and further arranged for replicating the tracking cells (520).

It is also a part of this invention that in the case that a tracking cell controller (510) does not longer persist the required performance to manage the tracking cells (520) assigned to it, a tracking cell controller controller can be implemented.

Cell controllers may be arranged in a redundant system architecture to avoid a single point of failure. Any known form of redundancy may be used to improve the availability of the system, such as hardware redundancy, information redundancy etc.

In an embodiment of the invention two or more cell controllers (510) are arranged in a redundant system architecture, and one or more of the cell controllers (510) are arranged for taking over the responsibility of one or more of the other cell controllers (510) in the redundant system architecture.

It will in the following be described how the track and trace system will record and add a new tracking record (400).

To instigate a new tracking that is requested to be recorded and stored in the system, a unique code (300) is transferred and captured by the system (500) along with the tracking information that is constituting the new requested tracking record (400). The unique code (300) is decrypted which process will extract and present the group (200) number (201) and internal sequence number (202) for the code within that group (200). If the decryption and authentication of an arbitrary code is unsuccessful, i.e. the code is not a valid unique code (300), the request is denied. This process also must determine if the level that requested code is belonging to is currently allowed to be tracked, in other words the code has been split as will be described below.

If the process is successful the information is conveyed to the file system where the appropriate compass (610) file will be retrieved and accessed based on the group number (201) and sequence number (202) information so made available.

This information will then be conveyed to the tracking cell controller (510). The tracking cell controller (510) will retrieve which tracking cells(s) (520) that are storing that group (200). The tracking cell controller (510) will then convey the information to the identified tracking cell(s) (520) and the tracking cell (520) will be instructed to insert and store the new requested tracking information as appropriate associated to the group number (201) and sequence number (202). A new tracking record (400) has now been recorded and committed. The protocol for ensuring that the tracking record (400) is not lost or otherwise compromised by software may use known such techniques such as ACID and distributed transaction techniques and protocols.

It will in the following be described how the system will retrieve the complete tracking history of a unique code (300). A complete tracking of a unique code (300) will be performed for the recorded tracking of all the levels in a straight vertical direction.

A unique code (300) is conveyed to a process by which the system will start a searching and retrieval process. The unique code (300) is decrypted which process will extracted and present the group number (201) and internal sequence number (202) for the unique code (300). If the decryption and authentication of an arbitrary code is unsuccessful i.e. the code is not a valid unique code (300) the request is denied.

If the process is successful the information is conveyed to the file system where the appropriate compass (610) file will be retrieved and accessed based on the group number (201) and sequence number (202) information available. The compass (610) files or collection of files will further retrieve and establish the vertical "family" line of the requested unique code. In effect if as an example 344 (sequence number by which the tracking has been requested), this vertical family line might be 255-3225-344-211-588. Any flags or other statuses that might be recorded in the file is also retrieved and used in the remainder of the process.

This information will then be conveyed to the tracking cell controller (510). The tracking cell controller (510) will retrieve which tracking cells(s) (520) that are storing that group number (201). The tracking cell controller (510) will then convey the information to the identified tracking cell(s) (520) and the tracking cell (520) will be instructed to search and retrieve the tracking information as appropriate associated to the group number (201) and sequence numbers (202) and established family vertical group. The tracking cell(s) (520) will now retrieve all the tracking records (400) to present the complete tracking tree. It is another distinctive advantage with the present invention that all the tracking records (400) and entries can be searched and retrieved independently and in parallel due to the fact that family relations are known and resolved before engaging the database search residing on the tracking cell(s) (520).

An aspect of the present invention is that as the product or item (100) is flowing in the supply chain only the top unique code (300) will be allowed tracked and traced. As a part of the process therefore it will be checked whether the level is still trackable. This goes for both higher levels and well as lower levels for the hierarchy in question. This will henceforth be referred to as a split tracking, ie. The braking up of the hierarchy so that the "child" of the father now has been activated for tracking and tracing process.

In an embodiment of the present invention the generation of the compass (610) file structure can be realized by not using an encryption process, but instead using any unique code (300) or packaging hierarchy received by the track and trace system as an "identical" digital file (560) consisting of unencrypted codes. Every code is recorded and an generated index whereby each such code is assigned and linked with a unique reference (600) in the same manner as described with the encrypted code. Using this index system as a service a compass (610) file can be generated in the same way as with the encrypted codes. This index can be operated by a computer system and requested as service giving the same information as with the decryption process. The advantage is that the same compass (610) file and cell system (510, 520) might be used for both embodiments virtually without any changes to the construction of the system.

Another embodiment of the invention is a situation where no hierchical tree structure for the product is constructed or used. Any code, encrypted or not encrypted, the system according to the invention can then store and retrieve associated tracking or other information by using the storage and search strategy using a group number (201) and sequence number (202) number associated with the code in the manner as have been described.

The invention claimed is:

1. A method for tracking and tracing items comprising the steps of;
   generating a group of unique codes in a computer implemented track and trace system, where each of said unique codes comprises a unique reference encrypted with a unique key,
   transferring said group of unique codes to an item marking location,
   marking each of one or more of said items with at least one of said unique codes, transferring one or more of said unique codes back to said computer implemented track and trace system, decrypting one or more of said unique codes, in said computer implemented track and trace system, with said unique key to obtain said unique references, creating one or more tracking records for one or more of said items marked with said unique codes, and storing said tracking records in one or more unique storage locations in said computer implemented track and trace system, creating a relation node for each of one or more of said items wherein said relation nodes are arranged in a tree structure having a parent node and at least one child node, and relationships between said relation nodes represent packaging relationships between said items, wherein one or more of said relation nodes are arranged for referring to said unique storage locations for said item represented by said relation node, and said unique references are unique references to said relation nodes, wherein one or more of said unique references are references to one or more of said unique storage locations via said relation nodes, wherein each of said unique references comprises a first level reference and a second level reference wherein said second level reference is unique within said first level reference, and wherein said first level reference corresponds to said group and said second level reference corresponds to a sequence number within said group.

2. The method of claim 1, further comprising the step of tracing one or more of said items marked with said unique codes, by decrypting said unique codes with said unique key to obtain said unique references and retrieving one or more of said tracking records corresponding to said marked items from said storage locations referred to by said unique references.

3. The method of claim 1, further comprising the step of retrieving tracking records for items in a packaging relationship to said traced items by looking up one or more neighbouring relation nodes of said relation nodes corresponding to said traced items, and retrieving tracking records from said unique storage locations referred to by said neighbouring relation nodes.

4. The method of claim 2, wherein said relation nodes comprises one or more flags arranged for representing states of said items.

5. The method of claim 4, wherein one of said flags is arranged to indicate that tracking records cannot be created for an item with a unique reference.

6. The method of claim 4, wherein one of said flags is arranged to indicate that an item is deemed to be withdrawn.

7. The method of claim 1, wherein one or more of said relation nodes represents said group and contains information that is common to all items marked with a unique code of said group.

8. The method of claim 1, further comprising the step of authenticating one or more of said marked items, by verifying that a decrypted unique reference identical to a generated unique reference can be derived by decrypting a unique code on a marked item with said unique key.

9. A computer implemented track and trace system for tracking and tracing items comprising;

a code generator arranged for generating a group of unique codes where each of said unique codes comprises a unique reference encrypted with a unique key, and transferring said group of unique codes to an item marking location, a code decrypter arranged for decrypting said unique codes after they have been transferred back to said track and trace system with said unique key to obtain said unique references, said computer implemented track and trace system arranged for creating one or more tracking records for one or more of said items marked with said unique codes, and storing said tracking records in one or more unique storage locations in said computer implemented track and trace system, said track and trace system arranged for creating a relation node for each of one or more of said items wherein said relation nodes are arranged in a tree structure having a parent node and at least one child node, and relationships between said relation nodes represent packaging relationships between said items, wherein one or more of said relation nodes are arranged for referring to a unique storage location for said item represented by said relation node, wherein said unique references are unique references to said relation nodes, wherein one or more of said unique references are references to one or more of said unique storage locations, via said relation nodes, wherein each of said unique references comprises a first level reference and a second level reference wherein said second level reference is unique within said first level reference, and wherein said first level reference corresponds to said group and said second level reference corresponds to a sequence number within said group.

10. The system of claim 9, arranged for tracing one or more of said items marked with said unique codes, by decrypting said unique codes with said unique key to obtain said unique references and retrieving one or more of said tracking records corresponding to said marked items from said storage locations referred to by said unique references.

11. The system of claim 9, arranged for retrieving tracking records for items in a packaging relationship to said traced items by looking up one or more neighbouring relation nodes of said relation nodes corresponding to said traced items, and retrieving tracking records from said unique storage locations referred to by said neighbouring relation nodes.

12. The system of claim 9, wherein one or more of said relation nodes are stored in flat files.

13. The system of claim 9, further comprising one or more computer implemented tracking cells, each arranged for managing a subset of said unique storage locations.

14. The system of claim 13, further comprising one or more computer implemented tracking cell controllers, each arranged for controlling one or more of said tracking cells.

15. The system of claim 13, wherein a tracking cell is arranged for managing a subset of said relation nodes.

16. The system of claim 15, wherein one or more of said tracking cell controllers are arranged for assigning the responsibility to tracking cells for managing a subset of said unique storage locations for one or more of said groups.

17. The system of claim 16, wherein two or more cell controllers are arranged in a redundant system architecture, and one or more of said cell controllers are arranged for taking over the responsibility from one or more of said other cell controllers in said redundant system architecture.

18. The system of claim 16, wherein a cell controller is arranged for performing backup of one or more of said tracking cells under the control of said cell controller and further arranged for replicating said tracking cells.

19. The method of claim 2, further comprising the step of retrieving tracking records for items in a packaging relationship to said traced items by looking up one or more neighbouring relation nodes of said relation nodes corresponding to said traced items, and retrieving tracking records from said unique storage locations referred to by said neighbouring relation nodes.

* * * * *